United States Patent [19]

Kuechler

[11] Patent Number: 4,616,562

[45] Date of Patent: Oct. 14, 1986

[54] VENTILATION SYSTEM FOR PIZZA OVENS

[76] Inventor: Irvin R. Kuechler, 172 E. 27th St., San Bernardino, Calif. 92404

[21] Appl. No.: 747,649

[22] Filed: Jun. 21, 1985

[51] Int. Cl.⁴ .................. F23J 11/00; F24C 15/20
[52] U.S. Cl. ................. 98/115.1; 126/299 R
[58] Field of Search ............. 126/19 R, 21 R, 21 A, 126/299 R, 299 D, 273 R, 273 A; 98/115.1; 219/400, 388; 312/236; 432/83, 233, 238

[56] References Cited

U.S. PATENT DOCUMENTS

| | | | |
|---|---|---|---|
| 2,525,614 | 6/1947 | Nelson et al. | 126/299 |
| 2,868,108 | 6/1955 | Petersen | 98/115 |
| 2,874,627 | 2/1959 | Simmonds | 98/115 |
| 3,006,333 | 7/1959 | Niemann | 126/19 |
| 3,303,839 | 2/1967 | Tavan | 126/299 D |
| 3,310,046 | 3/1967 | Scott et al. | 126/21 |
| 3,313,917 | 4/1967 | Ditzler et al. | 219/400 |
| 3,364,912 | 1/1968 | Dills et al. | 126/21 |
| 3,384,067 | 5/1968 | Rawald et al. | 126/21 |
| 3,400,649 | 9/1968 | Jensen | 126/299 D |
| 3,485,229 | 12/1969 | Gilliom | 126/21 A |
| 3,548,152 | 12/1970 | Klepzig | 219/400 |
| 3,633,561 | 1/1972 | Barnett | 126/21 R |
| 3,664,255 | 5/1972 | Kuechler | 98/115 K |
| 3,779,228 | 12/1973 | Mizuno et al. | 126/21 R |
| 3,943,836 | 3/1976 | Kuechler | 98/115 K |
| 3,952,640 | 4/1976 | Kuechler | 98/115 K |
| 4,038,912 | 8/1977 | Kuechler | 126/299 D |
| 4,056,877 | 11/1977 | Kuechler | 29/469 |
| 4,085,736 | 4/1978 | Kuechler | 126/299 D |
| 4,141,342 | 2/1979 | Kuechler | 126/299 D |
| 4,331,124 | 5/1982 | Seidel et al. | 126/21 A |
| 4,377,109 | 3/1983 | Brown et al. | 99/401 |
| 4,386,558 | 6/1983 | Holman et al. | 126/21 A X |
| 4,462,383 | 7/1984 | Henke et al. | 126/21 A |
| 4,467,782 | 8/1984 | Russell | 126/299 |
| 4,471,750 | 9/1984 | Burtea | 126/21 A |
| 4,475,534 | 10/1984 | Moriarty | 126/299 D |

Primary Examiner—Margaret A. Focarino
Attorney, Agent, or Firm—Gausewitz, Carr & Rothenberg

[57] ABSTRACT

Heat shield and ventilation system for a pizza oven uses cooling air drawn mainly from the outside, which is directed around all four sides and over the top of the pizza oven by a heat shielding shroud that covers the top, back and ends, but leaves the front of the oven free for access to the doors that extend across most of the oven front. The shroud side panels are provided with deflectors that redirect air to flow forwardly along the oven sides to cause it to follow in a path flowing laterally inwardly and upwardly along the oven front, providing a curtain of cooling air that mixes with and entrains the heated air at the oven front face to be drawn into an exhaust port at the center of the top of the oven front. The shroud provides both cooling air passages and passages for intake of combustion air into the oven burners and also provides passages between the oven and the shroud for flow of exhaust gases to be combined with the exhausted ventilation air which entrains the heated air from the exterior surface of the oven.

13 Claims, 8 Drawing Figures

VENTILATION SYSTEM FOR PIZZA OVENS

BACKGROUND OF INVENTION

Various types of cooling and ventilation arrangements have been devised for commercial cooking appliances of the type having open, substantially horizontal cooking surfaces. In these cooking appliances, the area above and in front of the cooking surface is open for access by the cook. The ventilation system generally draws room air over the cooking surface and up into an overhead hood where it may be mixed with makeup air provided from the outside and then exhausted by the combined action of an exhaust fan and the flow of the circulating makeup air. Such systems, however, provide ventilation but no significant cooling of the cooking appliance itself, nor is there provided any heat shielding for heat radiated from the appliance. These systems are basically exhaust or ventilation systems.

For cooking ovens, particularly the domestic self-cleaning type oven, ventilation systems have been provided which include means for flowing air over portions of the oven in order to maintain oven temperature below a maximum allowable temperature. In such arrangements, particularly those which are built into a wall, exhaust systems have been arranged to draw air in from the adjacent room and cause the air to flow over the oven sides for exhaust to the outside. These oven systems do not involve the use of outside makeup air for cooling and, thus, are less efficient in cooling. Moreover, they will greatly affect the temperature of the room in which the oven is installed because of the large amounts of ventilation air that is withdrawn from the room for ventilation of the oven. Furthermore, neither such ovens nor open top cooking appliances provide any arrangement for cooling or heat shielding the front of the oven and none provide for such cooling by means of makeup air drawn from the outside.

In pizza ovens, particularly those of the type which have a number of cooking levels and in which the cooking spaces are fully enclosed, having access through relatively large doors at the front of the oven, ventilation has been provided by conventional exhaust fans. Exhaust gases containing combustion products are vented independently through conventional means. No heat shielding, other than conventional insulation in oven wall construction, has been provided.

Accordingly, it is an object of the present invention to provide improved ventilation and heat shielding of cooking appliances.

SUMMARY OF THE INVENTION

In accordance with a preferred embodiment of the present invention, a cooking appliance having an access side at which access to the interior of a cooking enclosure is provided, is surrounded on its top, back and two sides with a ventilation shroud that is spaced from the cooking enclosure walls to provide air flow passages. An intake duct through which outside makeup air is driven is connected to the shroud which causes this cool makeup air to flow across the top and around the sides and back of the oven toward the access side. At the access side, the cooling air is turned to flow in a cooling air curtain along and across the access side of the oven into an exhaust port that is positioned to control and guide the formation of the access side cooling air curtain. The exhaust port is connected with an exhaust duct having an exhaust fan.

In a preferred embodiment, the encircling heat shroud not only forms cooling air passages over the top and around the back of the oven, but also forms a combustion air passage along the back of the oven for intake of air for the oven burners. Additionally, an exhaust manifold and duct is formed between the shroud and the top of the oven and connected with the ventilating air exhaust port and exhaust duct so that the exhaust fan will extract both the combustion product gases and the ventilating air.

DETAILED DESCRIPTION

Figure 1:
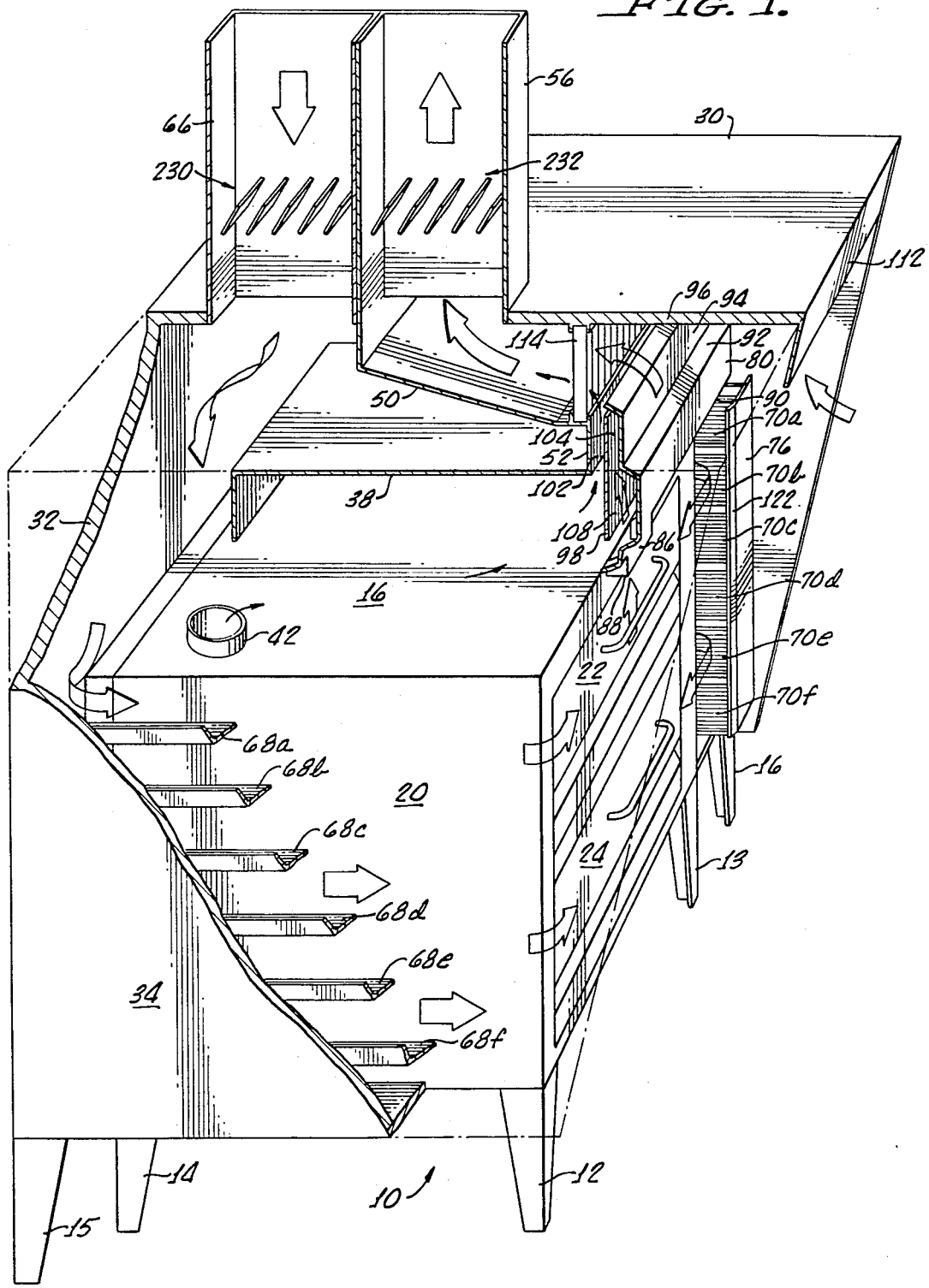
FIG. 1 is a pictorial illustration, with parts broken away, showing portions of a ventilating and heat shield assembly embodying principals of the present invention installed over and around a pizza oven.

As shown in FIGS. 1 through 4, a typical pizza oven 10 is supported above the floor on legs at each of its corners, including those shown at 12, 13, and 14. The oven comprises a cooking enclosure having a top 16, a bottom 17, front and rear sides 18 and 19, and lateral sides 20, 21. The front side 19 includes a plurality of substantially full width horizontally hinged doors 22, 24, which provide access to the interior of the cooking enclosure and cover a major portion of the entire front side or face of the oven. The area at the front of the oven, which must remain unobstructed for access to the interior, extends nearly for the full size of the oven, thereby, in the absence of the present invention, generating and projecting large quantities of heat into the adjacent room.

A heat shield and ventilation assembly for the oven extends around the cooking enclosure, covering the top, back and lateral sides, but does not cover the front side. Instead of extending along and covering the front side, which must remain unobstructed, cooling and ventilation of the front of the oven is provided by an air curtain which is formed by the remaining portions of the ventilating and shielding assembly. The ventilation and heat shield assembly is totally self-supported, also being supported on four corner legs, including those indicated at 15 and 16. Although the various baffles and walls of the ventilation and heat shield assembly, (to be described below) may touch or lightly rest upon various exterior surfaces of the oven, the assembly itself is actually self-supporting and, in this embodiment, is not connected to the oven.

The ventilation and heat shield assembly includes a top panel 30, a rear panel 32 and side panels 34, 36, which extend along and are spaced from the respective top, rear and lateral sides of the cooking enclosure. The assembly panels are made relatively thick and include suitable insulation material to provide a heat barrier for heat emanating from the oven. The panels, moreover, are all spaced from the corresponding exterior surfaces of the oven to provide various input and exhaust chambers and heat flow passages.

Figure 2:
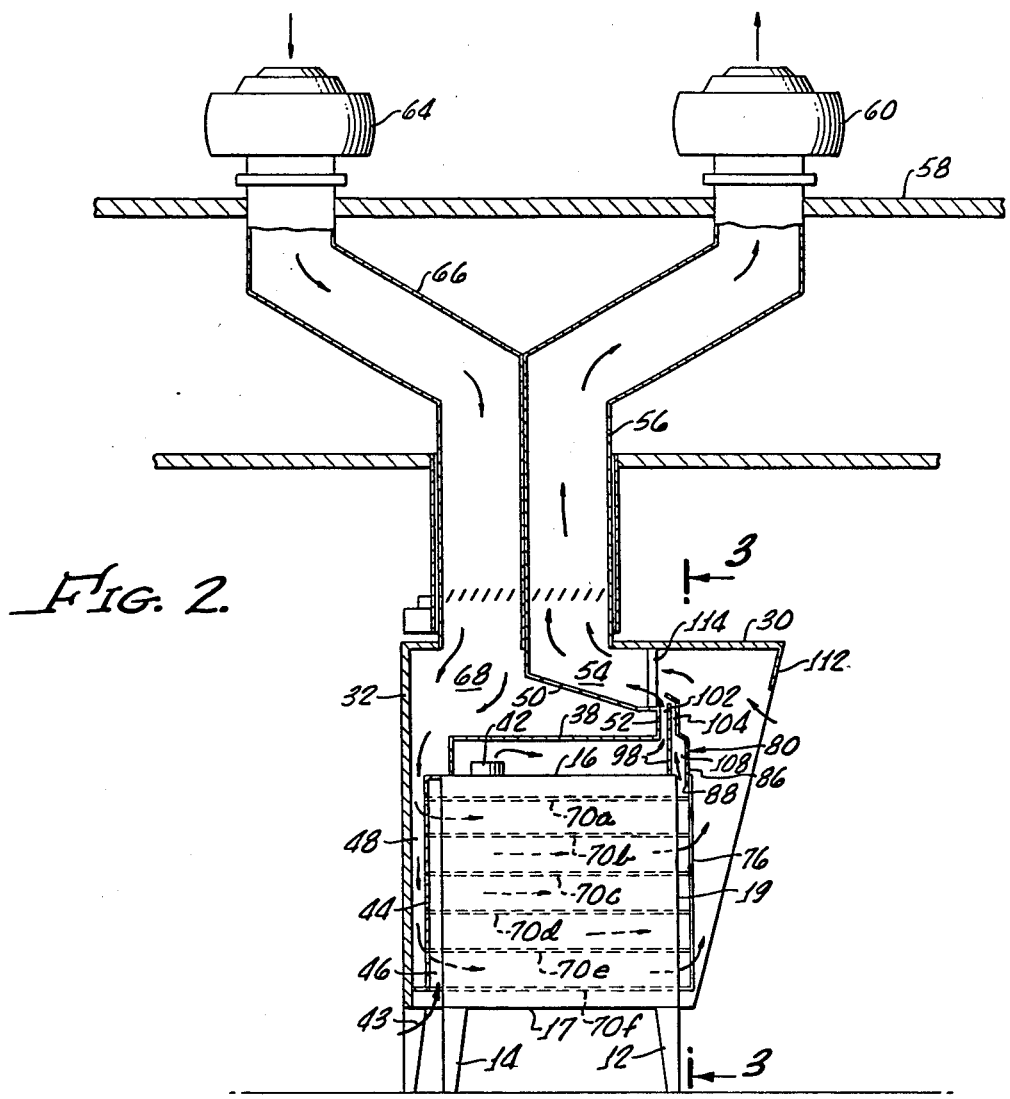
FIG. 2 is a vertical sectional view of the oven and ventilation assembly.
Figure 3:
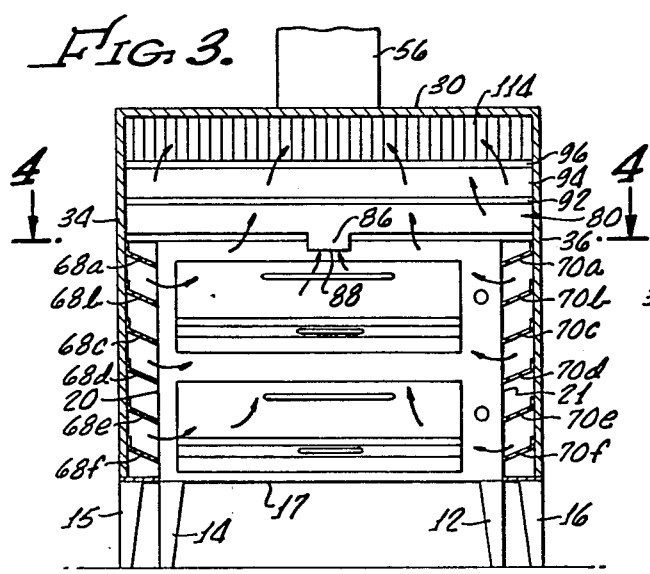
FIG. 3 is a section taken on lines 3—3 of FIG. 2.
Figure 4:
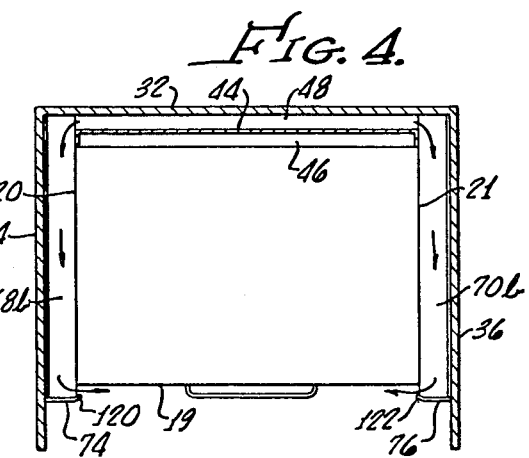
FIG. 4 is a section taken on lines 4—4 of FIG. 3.

As best illustrated in FIG. 2, the upper portion of the ventilation and heat shield assembly includes a first top wall 38 which extends along the top of the oven and is spaced therefrom above an exhaust duct 42 which discharges exhaust gases from the conventional burners or other heating sources contained within the oven. Air for use in the combustion within the oven burners is drawn in through the open bottom of the ventilation and heat shield assembly at the rear of the enclosure, as indicated by arrow 43, (FIG. 2) to pass between the rear side 18 of the oven and an uninsulated rear wall 44 of the ventilation and heat shield assembly. Wall 44 is spaced from the rear of the oven to provide an input passage 46 for flow of combustion air to the oven burners, and is also spaced from the insulated rear panel 32 of the ventilation and heat shield assembly to provide ventilation and cooling air flow passage 48 along the entire back of the oven.

An upper wall 50, above the exhaust gas wall 38 of the ventilation and heat shield assembly slopes rearwardly and upwardly from a front wall 52. Wall 50 forms the bottom of an exhaust chamber 54, which is coupled with an angulated exhaust duct 56, extending upwardly to and through the roof 58 of a room in which the oven is installed. The upper end of the exhaust duct is connected with an exhaust fan 60 for discharging both exhaust gases and spent cooling air to the atmosphere.

An intake fan 64 is mounted adjacent to the exhaust fan and connected to an angulated intake duct 66 which extends from the intake fan through the roof 58 and downwardly for connection to an intake distribution chamber or manifold chamber 68 formed between walls 50, 52, 38 and the upper portion of rear panel 32.

Each of the side panels 34, 36, carries a number of vertically spaced baffle plates, such as plates 68a, b, c, d, e, and f, and 70a, b, c, d, e, and f. The baffle plates are fixedly mounted to the inside surfaces of the side panels 34, 36, extending generally horizontally along the side panels and slope inwardly and downwardly toward the adjacent sides of the oven. The free cantilevered ends of the baffle plate preferably are in light contact with, but not attached to, the exterior surfaces of the oven sides.

The side panels 34, 36 each extends forwardly beyond the front base of the oven, with each front edge of a side panel tapering forwardly and upwardly to provide greater forward extension at the top than at the bottom. Secured to each side panel adjacent to the front edge of the bottom portion, and extending vertically upward are relatively narrow vertically extending deflector plates 74, 76, each of which extends along and across the entire vertical length of the lateral air flow passage that is formed between the assembly side panels and the oven sides. The deflector plates are located forwardly of the front face of the oven to enable air deflected by the plates to flow along the oven face.

An assembly front panel 80 extends across the full width of the front of the assembly between the side panels 34 and 36 to which the ends of the front panel are secured. The lower edge of front panel 80 is positioned substantially at the height of the upper edge of the front of the oven, except for a short central portion 86, which is displaced forwardly of the front and extends downwardly for a very short distance to form an intake port indicated at 88 in the drawings. This intake port is centrally positioned between the shroud side panels and is relatively narrow so as to draw cooling air toward the center of the assembly as will be more particularly described below. The front panel, from its lower edge 90 at the top of the oven, extends upwardly and inwardly via several angulated sections 92, 94, 96, being spaced from an inner vertical partition 98, which is fixed at its opposite ends to opposite side panels of the ventilation and heat shield assembly. The partition 98 has its lower edge positioned in contact with or closely adjacent to the top of the oven and has its upper edge slightly spaced below the inwardly and upwardly directed angulated section 96 of the front panel. Partition 98 is interposed between the front wall 52 and the panel sections 92, 94 of panel 80, to provide at its opposite sides first and second exhaust passages 102, 104, which communicate respectively with the exhaust gas chamber 16 below the heat assembly top wall 38 and a cooling air exhaust chamber 108 formed between the partition and the front panel 80.

As previously mentioned, side panels 34 and 36 extend further forwardly at their upper ends than at their lower ends, so that the forward portions of each of these side panels has a triangular configuration with the triangle apex at the lower edge. A downwardly and inwardly extending valance 112 is secured to the upper front edge of the assembly top panel 30. A filter or grease trap 114 extends between the inner lower surface of top panel 30 and the front upper edge of the wall 50, extending continuously from one side to the other of the ventilation assembly.

Outside air drawn in by suction fan 64 is blown through the intake duct 66 to intake chamber 68 from which it is distributed over the top of the oven and to both sides of the heat assembly and to the back. The cooling air is caused to flow downwardly through the rear passage 48 and laterally toward each opposite side panel. Air flowing through the rear passage 48 is turned at the rear lateral corners of the heat shield assembly by means of the side panels and thereafter flows in the lateral ventilation passages between the side panels of the ventilation and heat assembly and the lateral sides of the oven. These lateral passages are further defined by the downwardly and inwardly sloping baffle plates to cause the air to acquire a downward component of flow velocity as it flows forwardly from rear to front of the assembly. The forwardly flowing air impinges upon the rearwardly facing surfaces of each of deflector strips 74, 76, each of which has a slightly inwardly turned lip 120, 122, which insures that air flow which has been turned at a right angle will continue to flow along and close to the front of the oven.

Exhaust air is sucked by the exhaust fan 60 through the duct 56, through exhaust chamber 54 and through the ventilation gas exhaust chamber 108, into which it is drawn via centrally located exhaust port 88. The cooling air that is turned inwardly by deflectors 74, 76, flows along the front face of the oven from its sides toward the center. Hot air, heated by the oven, rises along the front face of the oven. The inwardly flowing cooling air, flowing inwardly along the oven face from both deflector plates toward the center of the oven, is drawn into the exhaust port 88, which thereby cooperates with the deflector strips 74, 76, to create a cooling air curtain that substantially blankets the entire open and uncovered front of the oven. The rising hot air at the oven front face aids the flow of cooling air in the cooling air curtain and thus the air flow passages, the downwardly inclined baffle plates, the turning deflectors, the exhaust port 88, and the various ducting connections to the exhaust fan 60 all cooperate to provide an efficient cooling air curtain that flows along and close to the oven face.

The downward component of motion that is imposed upon the flowing air by the downwardly sloping baffle plates causes the air that is turned by the deflector strips 74, 76, to initially flow inwardly and downwardly along the oven face. This causes the turned air to flow inwardly for a greater distance toward the lower portion of the center of the oven. Thus instead of immediately turning upwards as it leaves deflector plates 74, 76, to flow directly from the deflector to the centrally located exhaust port 88, the downward component of motion causes the air to move further inwardly and somewhat downwardly before it turns upwardly by the combined action of the rising heated air at the oven face and the sucking action of the exhaust port. Cooling air, as it flows upwardly, entrains the heated air at the oven face and flows either into the centrally positioned exhaust port 88 or upwardly past the front panel 80 to the space below the upper panel 30, where it is drawn through the full width grease trap 114 into exhaust chamber 54. The upper panel overhang acts as an air entrapping back up for the exhaust port 88, to collect and exhaust substantially all of the rising air at the oven face that does not flow into the exhaust port.

Thus it will be seen that the arrangement provides a configuration by which the one exhaust duct will perform a number of different functions. First, it will pull the combustion gases from exhaust chamber below the assembly top wall 38. Second, it will extract a mixture of the cooling air and heated air from the area below the front overhanging portion of assembly top wall 30. Third, the configuration provides a suction at the upper central portion of the front of the ventilation and heat shield assembly by means of exhaust port 88. This central suction is limited to a relatively short area in and about the center of the top of the assembly. Accordingly, the air turned by deflector 74, 76, will flow from the oven sides along the front face of the oven toward its center with relatively large horizontal components of motion and will not flow at sharp angles upwardly. The air flow in the air curtain and other cooling passages is depicted by the arrows in several figures, these arrows showing, for the front air curtain, that the air moves inwardly and downwardly from the deflector 74 before it turns upwardly to the relatively narrow centrally located exhaust port 88. The air curtain flows close to, along and substantially parallel to the access side or front face of the oven.

Figure 5:
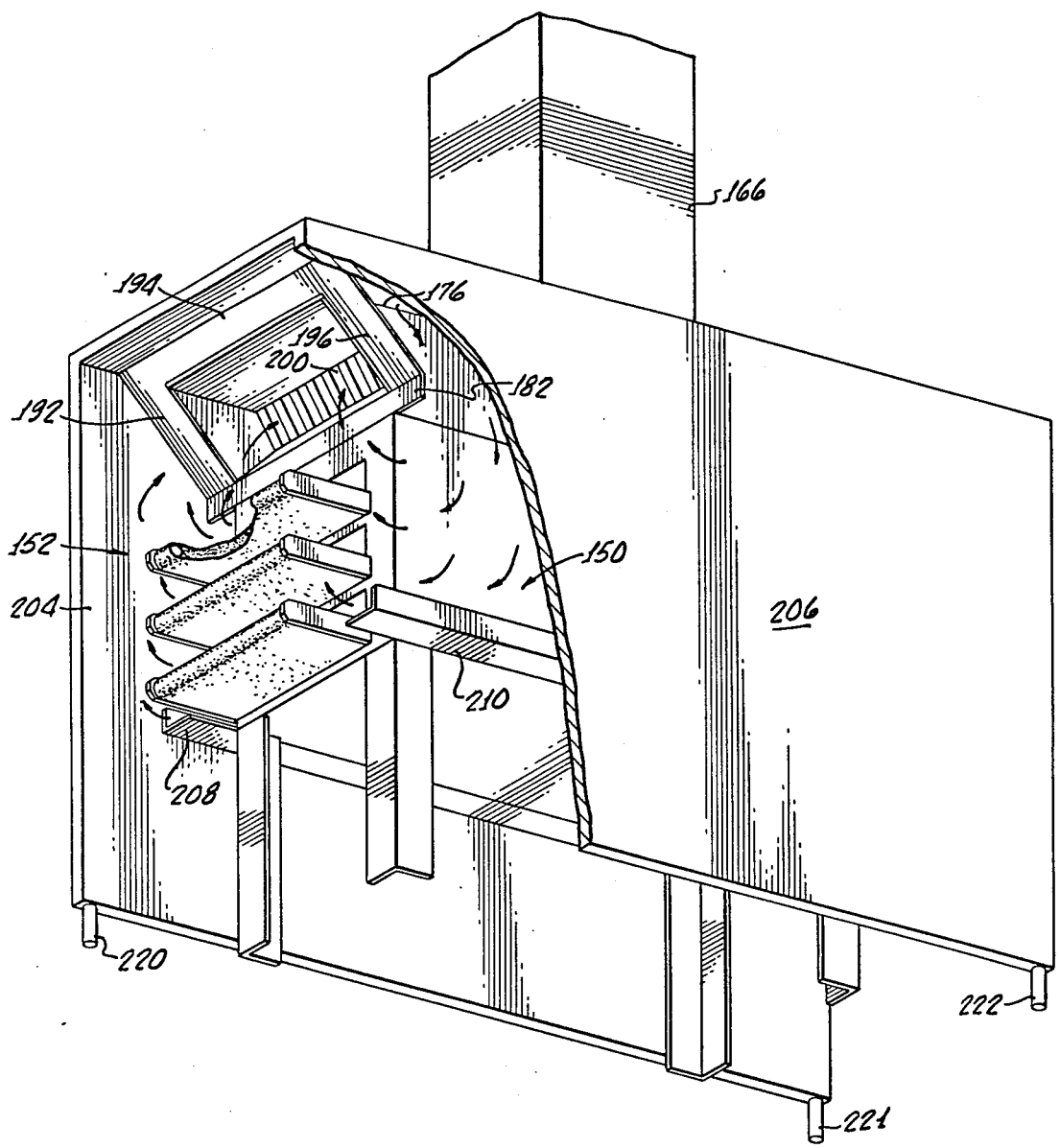
FIG. 5 is a pictorial illustration, with parts broken away, of a modified form of a ventilating and heat shield assembly, applied to a conveyor type pizza oven.
Figure 6:
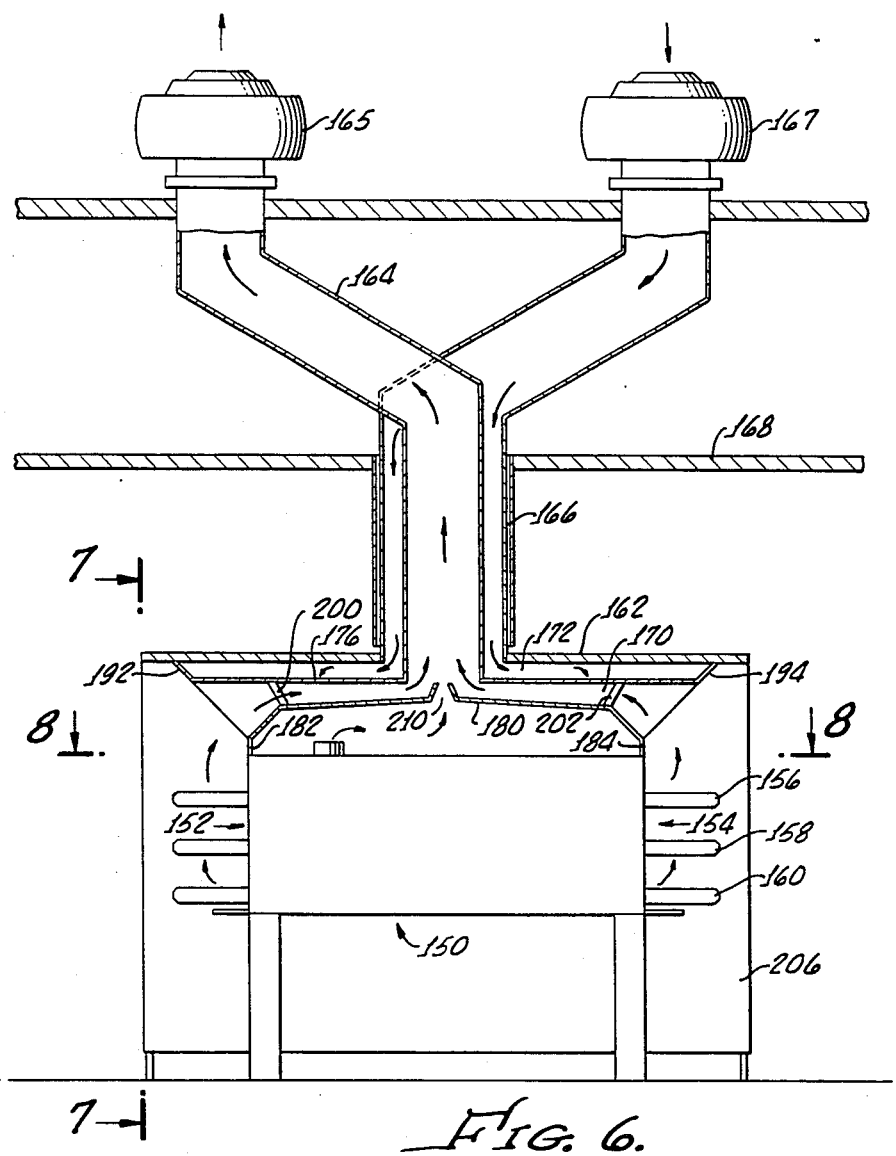
FIG. 6 is a vertical section of a ventilation and heat shield assembly of FIG. 5.
Figure 7:
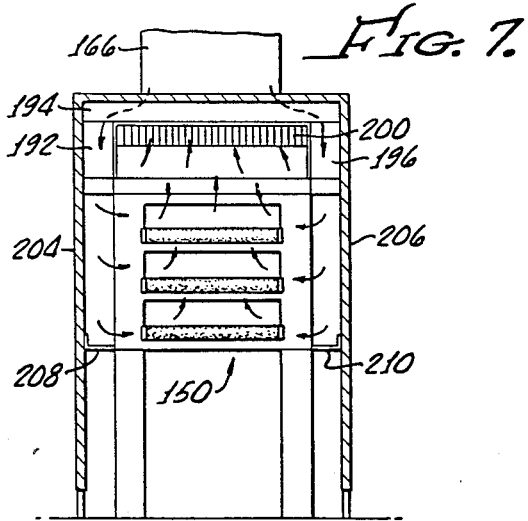
FIGS. 7 and 8 are sections taken on lines 7—7 and 8—8, respectively, of FIG. 6.

FIGS. 5, 6 and 7 illustrate an adaptation of the previously described ventilation and heat shield assembly to a free standing cooking device such as a pizza oven of the pass-through or conveyor type. In such an oven, the cooking enclosure 150 is open at both its front 152 and its rear 154, and includes a plurality vertically spaced horizontally moving food-handling conveyors 156, 158, and 160. Suitable heat sources (not shown) are included in the oven for heating food on the several conveyors as it is passed through from one end to the other. The food is cooked in a single pass through the oven from back to front and, accordingly, major portions of the area of both the back and front of the oven are open and must be unobstructed.

Adaptation of the described ventilation and heat shield assembly to this type of oven is achieved by forming the assembly with top panel 162, being continuous and insulated and having an exhaust duct and fan 164, 165 and an intake duct and fan 166, 167 extending vertically forward through the building roof, and through a ceiling partition 168 of the building to connection with an exhaust chamber 170 and an intake chamber 172, respectively. The intake chamber is formed between the insulated top panel 162 of the ventilation assembly and a first or intake partition 176 that extends horizontally from the bottom end of the exhaust duct 164, extending over the top of the oven. Secured to and spaced below the top panel 162 and partition 176 is a lower dome wall 180 which spans the oven and has downwardly turned end portions 182, 184, which lightly contact or terminate close to the top of the oven. The dome wall 180 is mounted to and between side panels 204, 206 below partition 176.

Figure 8:
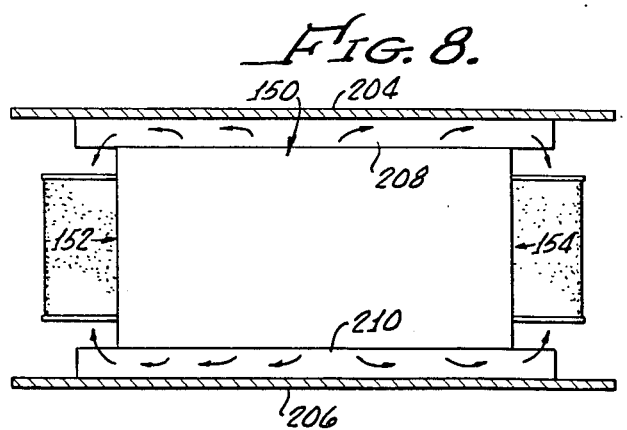

The intake chamber 172 terminates at areas near opposite ends of respective side panels in upwardly and forwardly sloping end plates 192, 194 at side panel 204 and end plates 196 and a corresponding end plate (not shown) adjacent side panel 206. Extending between the end plates for a major part of the shield assembly width at front and rear of the oven are grease traps 200, 202 which are set back a short distance beneath the intake partition 176 near the top of the assembly and rest upon dome wall 180 at the bottom of the grease traps. The grease traps form entrances to the exhaust chamber 170 from which spent cooling air is withdrawn via duct 164 and fan 165. Cooling air forced in by intake fan 167 flows through the intake duct 166 to the cooling air intake chamber 172 from which it is distributed over the top of the oven toward the front and back and downwardly along each side. The ventilation and heat shield assembly side panels 204, 206, are provided with baffle plates 208, 210, at positions corresponding to the bottom of the cooking enclosure, so that cooling air flowing down through the intake duct flows along the top of the oven and flows downwardly along the sides of the oven between the oven sides and the ventilation assembly side panels 204, 206, which are spaced from the oven sides to provide suitable air flow passages. The top and side panels extend sufficiently beyond the sides and ends of the oven, as can be best seen in FIGS. 5, 6 and 8, so as to adequately trap and confine heated air produced at the front and back openings of the oven where the several conveyors enter and exit. Heated air is confined by the extending panel top panel sides. The air-exhausting grease traps, centrally positioned above and inwardly of both input and output ends of the oven cooperate to provide air curtains flowing over the open face of the oven from the air passages at the sides (between the side panel 204, 206 and the oven sides). The air-exhausting grease traps, extending for a major part of the width of the oven, and displaced inwardly from the oven end faces, thus are able to draw a considerable portion of the cooling ventilating air flowing through the cooling side passages and also a considerable portion of the heated air emanating from the oven conveyor openings. The inward displacement (closer to the oven center) of the grease traps helps to cause the flowing air curtain to stay close to the oven end faces as the air curtains are caused to flow up to and to bend over and around the upper edges of the respective oven faces.

The dome wall 180 forms a chamber for combustion products exhausted from the heating devices of the oven, which combustion products are drawn through an exhaust port 210 in the dome wall 180 to mix with the ventilating air that is being exhausted through exhaust duct 164.

The ventilation and heat assembly of FIGS. 5 through 8, like that of FIGS. 1-4, is entirely self-supporting, being supported on its own four corner legs, and is neither supported on nor connected to the oven itself. Portions of the ventilation and heat shield assembly may be in contact with, but not otherwise connected with the oven.

In both embodiments of the ventilation and heat shield assembly described herein, a major portion of the ventilating air is drawn in from the outside and thus the system need not use nor exhaust large quantities of air from the interior of the room or structure in which the cooking device is installed. Because the makeup air for cooling is drawn from the outside and the system does not use previously conditioned air from the interior of the building structure, not only is more effective cooling achieved, but it is achieved without the loss of large quantities of costly conditioned air from the room interior. If deemed necessary or desirable, a modulating and damper system, including dampers (FIG. 1) 230, 232 may be installed in the intake duct. The modulating and damper system includes a thermostat (not shown) to sense operating air temperature within the intake chamber 68 or 172, or in any of the cooling air flow passages and to sense temperature of the incoming air supply at a position considerably closer to the intake fan. Such modulating and damper system will regulate air volume according to outside air temperature, modulating the system to provide a minimum amount of air flow so as to maintain a preset temperature within the intake chamber, such as chamber 68 for example, in cold weather and to provide maximum air flow when the outside air temperature is high.

Both systems provide a cooling air flow curtain over large unobstructed access openings of the ovens, the air flow curtain being provided in each case by a combination of lateral cooling air flow passages which terminate adjacent that face of the oven side or sides to which access is maintained and cooperating with an overhead exhaust positioned at the top of the oven to draw the cooling air flow from the lateral passages over, along and closely adjacent the face of the oven open area. The flow passages are constructed and arranged, as described above, so that the cooling air curtain is caused to closely blanket substantially the entire open and uncovered face of the oven, thus maintaining both freedom of access and cooling and heat shielding at the open oven face.

The foregoing detailed description is to be clearly understood as given by way of illustration and example only, the spirit and scope of this invention being limited solely by the appended claims.

What is claimed is:

1. In combination with a cooking appliance of the type having a cooking enclosure with a top and bottom, and front, rear and lateral sides, at least one of said front, rear, and lateral sides forming an access side having access means extending over a major portion of such one side to enable insertion and withdrawal of food into and from the interior of the cooking enclosure, a ventilation and heat shield system comprising:

a heat shield assembly adapted to extend around said cooking enclosure and to cover the top, rear and at least one other side of said enclosure, and being spaced from said enclosure to cooperate therewith to define cooling air flow passages between the heat shield assembly and the exterior of the sides of the said enclosure, said ventilation and heat shield assembly having an open area at a portion thereof corresponding to said access side of said cooking enclosure, said assembly open area being substantially coextensive with the access means of said access side, thereby to permit access to the interior of said enclosure without interference from said ventilation and heat shield assembly, means for projecting cooling air to and through said air flow passages to cause air to flow toward said open area of said ventilation and heat shield assembly and toward said access side of said cooking enclosure, said assembly further including exhaust means in an upper portion thereof for forming an exhaust chamber, means for withdrawing air from said exhaust chamber, and air curtain means included in said ventilation and heat shield assembly for causing cooling air flowing through said cooling passages to form a cooling air curtain that flows across said open area along and substantially parallel to said access side of said cooking enclosure toward said exhaust means, to thereby entrain heated air at and adjacent to the exterior of said access side of said cooking enclosure, thereby to significantly decrease the transfer of heat from said cooking enclosure into the adjacent area in front of said one side without interfering with access to said one side of the cooking enclosure.

2. The combination of claim 1 wherein said air curtain means comprises a relatively short, substantially centrally located exhaust opening on said ventilation and heat shield assembly in communication with said exhaust chamber, and deflector means at opposite edges of said open area of said ventilation and heat shield assembly for changing direction of the air flowing through said passages and directing such air toward said exhaust opening along and substantially parallel to said access side of said cooking enclosure.

3. The combination of claim 2 wherein said ventilation and heat shield assembly includes first and second side panels, each having a plurality of vertically-spaced, substantially horizontally-oriented baffle plates extending along the interior of the side panel, said deflector means including a relatively narrow vertically extending deflector strip secured adjacent forward edges of at least one of said side panels and positioned to cause air flowing along said baffle plates to turn sharply at said deflector strip and flow toward the other of said ventilation assembly and heat shield side panels.

4. The combination of claim 3 wherein at least some of said baffle plates are inclined downwardly from the side panel toward said cooking enclosure and toward the interior of said assembly, whereby cooling air flowing along said baffle plates is caused to move with a downward component of motion as it is turned inwardly by said deflector strip.

5. The combination of claim 1 wherein said cooking appliance is a free standing pizza oven of which said access side is a substantially vertical oven face, said access means including at least one opening in said face for transfer of food between the interior and exterior of said cooking enclosure, said air curtain being caused to blanket said vertical oven face and to flow along and close to said vertical oven face.

6. The combination of claim 1 wherein said ventilating and heat shield assembly comprises a self-supporting free-standing shroud having insulating top, back and side panels enclosing and spaced from corresponding sides of said cooking appliance to form cooling air flow passages between said shroud and said appliance, with said air flow being turned at front portions of said side panels by said air curtain means to flow across said open area of said ventilating and heat shield assembly.

7. The combination of claim 6 including means positioned between one of said panels and said cooking device for forming a combustion air intake that provides for flow of combustion air to the interior of said cooking appliance from the ambient environment.

8. The combination of claim 6 wherein said exhaust chamber includes a first chamber portion for receiving ventilation and cooling air that flows along said access side and a second chamber portion for receiving exhaust combustion gas from said enclosure, said means for withdrawing air from said exhaust chamber including means for withdrawing air from both said chamber portions.

9. A ventilation and heat shield assembly for a cooking device having an opening on at least one substantially vertical side thereof that covers a major portion of such side, said ventilation and heat shield assembly comprising:
   an insulating enclosure having an insulating top and side panels forming air flow passages arranged to flow cooling air along the top panel to the side panels and along the side panels to an end of such side panels,
   intake fan means for blowing ventilating air from outside of a room in which the assembly is installed to the interior of said enclosure to flow along said top panel and along said side panels to said side panel ends,
   means for mounting said intake fan means to draw in outside air
   exhaust chamber means extending along an upper portion of said ventilating and heat shield assembly from one of said side panels to the other and having an exhaust port positioned adjacent to said top panel, said ventilation and heat shield assembly having a substantially vertically extending open area at a side thereof that extends from one of said side panel ends to the other,
   exhaust fan means for exhausting air from said exhaust chamber, and
   air curtain means included in said ventilation and heat shield assembly for causing air drawn into the assembly by said intake fan means to flow along the interior of said assembly and to flow in an air curtain across the open side of said assembly to said exhaust port to be exhausted by said exhaust fan means.

10. The assembly of claim 9 wherein said ventilating and heat shield assembly is installed within a cooking area having a ceiling and wherein said intake and exhaust fans are positioned above said ceiling whereby makeup air from outside the cooking room is drawn into the assembly as cooling air and whereby air is exhausted to the outside by said exhaust fan means.

11. The assembly of claim 9 wherein said air curtain means includes a pair of vertically extending deflector strips fixed to ends of said side panels for deflecting air flowing along said side panels and causing said deflecting air to flow across the open area of said ventilating assembly, said exhaust chamber means extending along the top of the open side of said ventilation assembly and said exhaust port being positioned at a central point of said open side of said ventilation and heat shield assembly for extracting air deflected by said deflector strips.

12. A ventilation and heat shield assembly for a pizza oven having an opening on at least one substantially vertical side thereof that covers a major portion of such side, said ventilation and heat shield assembly comprising:
   an insulating enclosure having an insulating top and side panels forming air flow passages arranged to flow cooling air along the top panel to the side panels and along the side panels to an end of such side panels,
   intake fan means for blowing ventilating air from outside of a room in which the assembly is installed to the interior of said enclosure to flow along said top panel and along said side panels to said side panel ends,
   means for mounting said intake fan means to draw in outside air
   exhaust chamber means extending along an upper portion of said ventilating and heat shield assembly from one of said side panels to the other and having an exhaust port positioned adjacent to said top panel, said ventilation and heat shield assembly having a substantially vertically extending open area at a side thereof that extnds from one of said side panel ends to the other, and
   exhaust fan means for exhausting air from said exhaust chamber, a pizza oven to be cooled by said assembly, said oven being positioned between said side panels and below said top panel, said oven having open front and back ends and a plurality of vertically spaced food conveyors for transporting food through the oven between said open front and back ends, said assembly being U-shaped and having both front and back ends open to permit access to said oven ends, said assembly including a second exhaust port, both said exhaust ports positioned between the top panel and said oven adjacent the oven front and back ends, respectively, said exhaust ports being displaced toward each other and inwardly relative to said oven ends to cause air rising along said oven front and back ends to be drawn inwardly in a flow path that bends around upper portions of the oven front and back ends, whereby flow of cooling air is controlled by said intake fan means, said top and side panels, said exhaust ports and said exhaust fan means comprising means for forming an air curtain that flows upwardly along said oven front and back ends.

13. A ventilation and heat shield assembly for a cooking device having an opening on at least one substantially vertical side thereof that covers a major portion of such side, said ventilation and heat shield assembly comprising:
   an insulating enclosure having an insulating top and side panels forming air flow passages arranged to flow cooling air along the top panel to the side panels and along the side panels to an end of such side panels,
   intake fan means for blowing ventilating air from outside of a room in which the assembly is installed to the interior of said enclosure to flow along said top panel and along said side panels to said side panel ends, means for mounting said intake fan means to draw in outside air exhaust chamber means extending along an upper portion of said ventilating and heat shield assembly from one of said side panels to the other and having an exhaust port positioned adjacent to said top panel, said ventilation and heat shield assembly having a substantially vertically extending open area at a side thereof that extends from one of said side panel ends to the other, and exhaust fan means for exhausting air from said exhaust chamber, the assembly being of substantially inverted U-shape having both front and back ends open to thereby accommodate an oven having access openings extending along the entire area of its front and back, said assembly including top and side panels that extend beyond the open ends of the oven and including a second exhaust port, said exhaust ports extending across said assembly at the opposite open ends thereof, said exhaust ports being positioned below the top panel of the assembly and spaced inwardly of the ends of said top and side panels, and inwardly of the front and back of an oven enclosed by the assembly to entrain and entrap upwardly flowing heated and exhausted ventilation air, whereby air drawn into the assembly by said intake fan means is caused to flow along the interior of said assembly and to flow in an air curtain across the open side of said assembly to said exhaust ports to be exhausted by said exhaust fan means.

* * * * *